United States Patent [19]

Asahi et al.

[11] Patent Number: 4,482,686

[45] Date of Patent: Nov. 13, 1984

[54] CATALYST AND PROCESS FOR STEREOSPECIFIC POLYMERIZATION OF α-OLEFINS

[75] Inventors: Satoshi Asahi, Sodegaura; Shigeo Mori, Ichihara; Yasuhiro Takeshita, Sodegaura, all of Japan

[73] Assignee: Idemitsu Kosan Company Limited, Tokyo, Japan

[21] Appl. No.: 538,352

[22] Filed: Oct. 3, 1983

Related U.S. Application Data

[63] Continuation of Ser. No. 264,800, May 18, 1981, abandoned.

[30] Foreign Application Priority Data

May 23, 1980 [JP] Japan ................................ 55-67857

[51] Int. Cl.$^3$ ........................... C08F 4/02; C08F 10/06
[52] U.S. Cl. ..................... 526/119; 502/119; 502/124; 502/127; 526/124; 526/351
[58] Field of Search .......................................... 526/119

[56] References Cited

U.S. PATENT DOCUMENTS

| | | | |
|---|---|---|---|
| 4,069,169 | 1/1978 | Toyoda et al. | 526/119 |
| 4,115,319 | 9/1978 | Scata et al. | 526/125 |
| 4,328,121 | 5/1982 | Capshew | 526/124 |
| 4,331,790 | 5/1982 | Ligorati et al. | 526/119 |

FOREIGN PATENT DOCUMENTS

1564460  4/1980  United Kingdom ................ 526/125

Primary Examiner—Edward J. Smith

Attorney, Agent, or Firm—Frishauf, Holtz, Goodman & Woodward

[57] ABSTRACT

A process for the stereospecific polymerization of α-olefins which comprises polymerizing an α-olefin with a catalyst comprising (A) the reaction product of a magnesium compound and a titanium compound and (B) an organo-aluminum compound. Component (A) is prepared by reacting a (i) magnesium compound of the formula $Mg(OR^1)_n X^1_{2-n}$ wherein $R^1$ contains from 1 to 10 carbon atoms and is an alkyl group, a cycloalkyl group, an aryl group, or an aralkyl group, $X^1$ is a halogen atom, and n is a real number of from 1.0 to 2.0, with (ii) at least one halogen-containing compound selected from the group consisting of halogenated hydrocarbons, oxygen-containing halogenated hydrocarbons, halogenated thionyls, halogen-containing phosphorus compounds and halogen-containing nitrogen compounds, and (iii) an oxygen-containing titanium compound of the formula $Ti(OR^2)_4$ wherein $R^2$ contains from 1 to 10 carbon atoms and is an alkyl group, a cycloalkyl group, an aryl group or an aralkyl group, (iv) in the presence or in the absence of an organic acid ester to produce a solid reaction product. Said solid reaction product is, as it is or after a pre-treatment with an organic acid ester, reacted with a halogen-containing tetravalent titanium compound of the formula $Ti(OR^3)_m X^2_{4-m}$ wherein $R^3$ contains from 1 to 10 carbon atoms and is an alkyl group, a cycloalkyl group, an aryl group or an aralkyl group, $X^2$ is a halogen atom, and m is a real number of from 0 to 3.0, in the presence or in the absence of an organic acid ester, and always in the presence of an organic acid ester when an organic acid ester was not used in at least one of the preceding steps.

17 Claims, No Drawings

CATALYST AND PROCESS FOR STEREOSPECIFIC POLYMERIZATION OF α-OLEFINS

This application is a continuation, of application Ser. No. 264,800, filed May 18, 1981, now abandoned.

BACKGROUND OF THE INVENTION

This invention relates to a process for highly stereospecific polymerization of α-olefins, such as ethylene, propylene, butene-1, etc., particularly propylene, with high activity. More particularly, it relates to a process for the production of highly stereospecific poly-α-olefins in a process having excellent polymerization activity, which comprises polymerizing an α-olefin in the presence of a catalyst comprising a specific activated titanium catalyst component and an organoaluminum compound.

A Ziegler-Natta catalyst comprising a compound of a transition metal belonging to Group IV to VI and an organic compound of a metal belonging to Group I to III of a periodic table has been in widespread use for polymerization of olefins. When polymerizing propylene using titanium trichloride and diethylaluminum chloride, the polymerization activity is not sufficiently high although the yield of the stereospecific polymer which is insoluble in heptane is very high, and thus it is necessary to remove the catalyst residue from the polymer product. A number of methods for polymerizing propylene by the use of a solid catalyst, which is prepared by supporting titanium tetrachloride on a support, such as a magnesium compound, and a triethylaluminum type catalyst, have been proposed. In accordance with these methods, however, the stereospecific property of the polymer product is not sufficiently high although the polymerization activity is very high.

Thus, in general, the polymerization activity of a catalyst and the stereospecific property of the polymer product are antipodal to each other and it has been believed that it is very difficult to improve both the polymerization activity and stereospecific property to high levels at the same time. No method has been proposed which is improved to the extent that both the polymerization activity and stereospecific property are satisfactory.

It is an object of the invention to overcome the prior art defects and to provide a method which increases both the polymerization activity and the stereospecific property of the polymer to high levels.

SUMMARY OF THE INVENTION

This invention provides a process for the stereospecific polymerization of α-olefins which comprises polymerizing the α-olefin in the presence of a catalyst comprising (A) the reaction product of a magnesium compound and a titanium compound and (B) an organoaluminum compound, wherein Component (A) is prepared by a method comprising the following two steps:

(a) (i) a magnesium compound of the formula:

$$Mg(OR^1)_n X^1_{2-n}$$

wherein $R^1$ contains from 1 to 10 carbon atoms and is an alkyl group, a cycloalkyl group, an aryl group or an aralkyl group, $X^1$ represents a halogen atom, and n is a real number of from 1 to 2;
is reacted with (ii) at least one halogen-containing compound selected from the group consisting of a halogenated hydrocarbon, an oxygen-containing halogenated hydrocarbon, a halogenated thionyl, a halogenated phosphorus compound and a halogen-containing nitrogen compound, and (iii) an oxygen-containing titanium compound of the formula:

$$Ti(OR^2)_4$$

wherein $R^2$ contains from 1 to 10 carbon atoms and is an alkyl group, a cycloalkyl group, an aryl group or an aralkyl group;
in the presence or in the absence of an organic acid ester; and (b) the solid material formed in Step (a) is, as it is or after a pre-treatment with an organic acid ester, reacted with a halogen-containing tetravalent titanium compound of the formula:

$$Ti(OR^3)_m X^2_{4-m}$$

wherein $R^3$ contains from 1 to 10 carbon atoms and represents an alkyl group, a cycloalkyl group, an aryl group or an aralkyl group, $X^2$ represents a halogen atom, and m is a real number of from 0 to 3.0;
in the presence of or in the absence of an organic acid ester, except that it is in the presence of an organic acid ester when organic acid ester is not used in the preceding steps.

DETAILED DESCRIPTION OF THE INVENTION

The magnesium compound as used herein is of the general formula:

$$Mg(OR^1)_n X^1_{2-n}$$

$R^1$ contains from 1 to 10 carbon atoms and is a straight or branched chain alkyl, cycloalkyl, aryl or aralkyl group.

$X^1$ is a halogen atom, for example, chlorine and bromine.

n is a real number ranging between 1.0 and 2.0.

Examples of these magnesium compounds include magnesium dialkoxides, such as magnesium dimethoxide, magnesium diethoxide, magnesium dipropoxide, magnesium dibutoxide, etc.; and magnesium monohalogenated monoalkoxides, such as magnesium monochloro-monomethoxide, magnesium monochloro-monoethoxide, magnesium monochloro-monopropoxide, etc.

The halogen-containing compound as used herein is a halogenated hydrocarbon, an oxygen-containing halogenated hydrocarbon, a halogenated thionyl, a halogenated phosphorus compound or a halogen-containing nitrogen compound. These compounds may be used singly or in combination with each other.

Examples of halogenated hydrocarbons include halogenated alkyl, halogenated aryl, halogenated aralkyl and halogenated allyl. In greater detail, n-butyl chloride, monochlorobenzene, allyl chloride, carbon tetrachloride, ethyl iodide, etc. can be used.

Examples of oxygen-containing halogenated hydrocarbons include halogenated benzoyl, halogenated epoxy and halogenated alkoxycarbonyl. In greater detail, epichlorohydrin, ethyl chloroformate, etc. can be used.

Examples of halogenated thionyls include thionyl chloride and thionyl bromide.

Examples of halogenated phosphorus compounds include halogenated phosphoryl, such as phosphoryl chloride; trihalogenated phosphorus compounds, such as phosphorus trichloride, and penta-halogenated phosphorus compounds, such as phosphorus pentachloride.

Examples of halogen-containing nitrogen compounds include halogen-containing acetonitriles, such as trichloroacetonitrile; and halogen-containing nitrosyls, such as nitrosyl chloride.

The oxygen-containing titanium compound used herein is of the formula:

$$Ti(OR^2)_4$$

wherein $R^2$ contains 1 to 10 carbon atoms and is a straight or branched chain alkyl, cycloalkyl, aryl or aralkyl group as in $R^1$. Examples of these oxygen-containing titanium compounds are: $(CH_3O)_4Ti$, $(C_2H_5O)_4Ti$, $(nC_3H_7O)_4Ti$, $(n-C_4H_9O)_4Ti$, $(C_6H_{11}O)_4Ti$, $(C_6H_5O)_4Ti$, etc.

Component (A) of the catalyst for use in the process of the invention is prepared by a two-stage procedure. At the first stage, the magnesium compound, halogen-containing compound and the oxygen-containing titanium compound, are placed in an inert solvent, and they are reacted with agitation (stirring) at a predetermined temperature for a predetermined period of time to modify the magnesium compound. It is effective to add an organic acid ester to the reaction system.

The reaction temperature is usually from 0° C. to 150° C. and preferably from 20° C. to 100° C. in that the reaction proceeds efficiently and the polymerization activity of the catalyst formed is increased.

The reaction time is usually within the range of from 5 minutes to 5 hours and preferably from 30 minutes to 3 hours, although it varies depending on the reaction temperature.

The amount of each compound added varies depending on the type of the compound, the reaction conditions, etc. and can be appropriately determined. In general, the amount of the halogen-containing compound added should be from 0.05 to 20 moles, preferably from 0.1 to 5 moles per mole of the magnesium compound. The amount of the oxygen-containing titanium compound added should be from 0.02 to 5 moles, preferably from 0.05 to 1 mole per mole of the magnesium compound.

When the halogen-containing compound and oxygen-containing titanium compound are added in greater amounts, the polymerization activity of the catalyst formed is insufficiently improved. When the amount of the halogen-containing compound and oxygen-containing titanium compound added are too small, the polymerization activity of the catalyst formed is also insufficient, and the stereospecific property of the polymer formed is not so high.

Any of inert solvents which do not react with the foregoing magnesium compound, halogen-containing compound and oxygen-containing titanium compound can be used as the solvent in the foregoing contact reaction. Examples of such solvents include aliphatic hydrocarbons, alicyclic hydrocarbons and aromatic hydrocarbons, such as pentane, hexane, heptane, cyclohexane, benzene, toluene, xylene, etc.

In the process of the invention, it is preferred to perform the reaction in the presence of a solvent, but the reaction may be performed in the absence of a solvent. In this case, predetermined amounts of the magnesium compound, halogen-containing compound and oxygen-containing titanium compound are placed in a ball mill, etc. and mechanically mixed to perform the reaction.

The above described reaction is carried out in the presence of or in the absence of an organic acid ester. When such an organic acid ester is added to the reaction system, there is no special limitation to the time at which it is added. It may be added before the addition of the foregoing compounds, or simultaneously with the compounds, or after the addition of the compounds.

Examples of organic acid esters which can be used include aliphatic carboxylic acid esters, such as methyl formate, n-butyl formate, ethyl acetate, n-amyl acetate, vinyl acetate, benzyl acetate, cyclohexyl acetate, methyl acrylate and methyl methacrylate; and aromatic carboxylic acid esters, such as methyl benzoate, ethyl benzoate, n-propyl benzoate, iso-propyl benzoate, n-butyl benzoate, iso-butyl benzoate, sec-butyl benzoate, tertbutyl benzoate, n-amyl benzoate, iso-amyl benzoate, methyl toluylate, ethyl toluylate, n-butyl toluylate, iso-butyl toluylate, sec-butyl toluylate and tert-butyl toluylate.

When the organic acid ester is present in the first stage of the reaction system, the amount of organic acid ester is from 0.05 to 5 moles, preferably from 0.1 to 3 moles per mole of the magnesium compound. The addition of the organic acid ester within the foregoing range increases the polymerization activity and the stereospecificity of the polymer product.

In accordance with the process of the invention, the solid material formed by the reaction at the first stage, which is a modified product of the magnesium compound, is further treated in the second stage. That is, at the second stage, the solid material is, after being washed or without being washed, reacted with a halogen-containing tetravalent titanium compound of the formula:

$$Ti(OR^3)_m X^2_{4-m}$$

in the presence of or in the absence of an organic acid ester.

In the above formula, $R^3$ contains from 1 to 10 carbon atoms and is a straight or branched chain alkyl, cycloalkyl, aryl or aralkyl group, $X^2$ is a halogen atom, such as chlorine and bromine, and m is a real number ranging from 0 to 3.0.

Suitable examples of such halogen-containing tetravalent titanium compounds include tetrahalogenated titanium, and halogenated alkoxy titanium such as $TiCl_4$, $TiBr_4$, $CH_3OTiCl_3$, $(C_2H_5O)_2TiCl_2$, etc. They may be used singly or in combination with each other. Of these compounds, highly halogen-containing compounds are preferred and particularly titanium tetrachloride ($TiCl_4$) is preferred.

Prior to the introduction into the second stage, the solid material formed at the first stage may be subjected to a pre-treatment using an organic acid ester. The organic acid ester used for the pre-treatment may be the same as or different from that as described hereinbefore. In the practice of the pre-treatment, the solid material and an organic acid ester which is added directly thereto may be co-milled, or the solid material and organic acid ester may be placed in a solvent, such as pentane, hexane, heptane and octane, to perform a slurry reaction. The reaction temperature is from 0° C.

to 150° C. and preferably from 20° to 100° C. The reaction time is from 5 minutes to 5 hours and preferably from 30 minutes to 3 hours. After the pre-treatment, in either of the co-milling or the slurry reaction, the solid material is washed with a hydrocarbon such as pentane, hexane, heptane and octane, or is not washed, and then is sent to the second stage.

At the second stage of the present process, the solid material formed at the first stage or that subjected to the foregoing pre-treatment is reacted with a halogen-containing tetravalent titanium compound. This reaction is carried out in the presence of or in the absence of an organic acid ester. When the organic acid ester has not been reacted at the preceding steps, that is, an organic acid ester was not used at the first stage and furthermore the solid material formed was not subjected to pre-treatment with the organic acid ester prior to the second stage, then it is necessary for an organic acid ester to be present (used) in the second stage. That is, in accordance with the process of the invention, it is required that an organic acid ester be used in one or both of the reaction systems at the first and second stages, or that the solid material formed at the first stage is subjected to the pre-treatment. The organic acid ester used in the reaction system of the second stage may be the same as used in the first stage or in the pre-treatment and can be selected from aliphatic carboxylic acid ester and aromatic carboxylic acid esters.

The amounts of the halogen-containing tetravalent titanium compound and organic acid ester used in the second stage of the invention vary depending on the compounds used, the reaction conditions, etc., and can be appropriately determined. In general, however, the amount of the halogen-containing tetravalent titanium compound used should be from 0.5 to 100 moles, preferably from 1 to 50 moles per mole of the magnesium compound. The amount of the organic acid ester used should be from 0.05 to 5 moles, preferably from 0.1 to 3 moles per mole of the magnesium compound.

When the halogen-containing tetravalent titanium compound and organic acid ester are used in amounts without the foregoing ranges, the polymerization activity of the catalyst is not sufficiently improved, and the stereospecific property of the polymer product is not satisfactory.

There is no limitation to the order in which the compounds are added at the second stage. For example, (1) a method in which the halogen-containing tetravalent titanium compound and organic acid ester are simultaneously added to the solid material, and (2) a method in which the solid material is subjected to the pre-treatment by adding the organic acid ester and then the halogen-containing tetravalent titanium compound is added can be used.

The second stage of the present process is performed in the order as described above. Usually it is carried out in a liquid phase of the halogen-containing tetravalent titanium compound or in an inert solvent, such as pentane, hexane, heptane and cyclohexane, at a reaction temperature of from 20° C. to 200° C., preferably from 50° C. to 150° C. for a period of from 30 minutes to 10 hours, preferably from 1 hour to 5 hours.

The solid material thus formed at the second stage may be washed with an inert hydrocarbon, such as pentane, hexane, heptane, cyclohexane, etc., and the solid material thus washed is used as Component (A) (solid catalyst component) of the polymerization catalyst for use in the polymerization of the α-olefin.

In accordance with the process of the invention, the solid product formed above is used as Component (A) and an organoaluminum compound is used as Component (B), and the α-olefin is polymerized in the presence of a catalyst comprising Component (A) and Component (B).

In the polymerization of an α-olefin in accordance with the invention, a dispersion of Component (A) and the organoaluminum compound of Component (B) are added to the reaction system and nitrogen, oxygen, phosphorus or sulfur-containing compounds, such as electron donor compounds (e.g., esters, ethers, etc.) may be added thereto. Thereafter, the α-olefin is introduced into the reaction system. The polymerization method, the polymerization conditions, etc., are not critical. A slurry polymerization in an inert hydrocarbon solvent, a liquid phase polymerization which does not use an inert solvent, or a gas phase polymerization, can be used. The polymerization may be performed continuously or discontinuously.

With regard to the amount of the catalyst used, referring to the slurry polymerization using an inert hydrocarbon solvent or the liquid phase polymerization which does not use an inert solvent, the amount of Component (A), calculated based on the titanium atom is from 0.001 to 5 millimoles per liter, preferably from 0.005 to 1 millimole per liter. The molar ratio of Component (B) to titanium atom in Component (A) is from 1:1 to 1,000:1 and preferably from 10:1 to 500:1. The amount of the electron donor compound which is added is controlled within the range of from 0 to 5 moles, preferably from 0.05 to 1 mole per mole of the aluminum compound in Component (B).

The pressure of the α-olefin in the polymerization system is preferably from atmospheric pressure to 50 kg/cm$^2$, and the polymerization temperature is from 10° C. to 200° C. and preferably from 40° to 100° C. During polymerization, the molecular weight of the polymer product can be adjusted by known techniques, for example, by the use of hydrogen. The polymerization time is selected within the range of from 5 minutes to 10 hours.

Suitable examples of Component (B) which can be used in the process of the invention are organoaluminum compounds including trialkylaluminum compounds, such as trimethylaluminum, triethylaluminum, triisopropylaluminum, triisobutylaluminum and trioctylaluminum; and dialkylaluminum monohalides, such as diethylaluminum monochloride, diisopropylaluminum monochloride, diisobutylaluminum monochloride, and dioctylaluminum monochloride. These compounds can be used singly or in combination with each other.

The α-olefin used in the present invention is usually represented by the formula:

$$R^4-CH=CH_2$$

wherein R$^4$ is hydrogen or an alkyl group containing from 1 to 6 carbon atoms. Examples of these α-olefins include straight monoolefins, such as ethylene, propylene, butene-1, hexene-1, and octene-1, branched monoolefins, such as 4-methyl-pentene-1, and dienes, such as butadiene. The process of the invention can be effectively utilized either for the homopolymerization of such α-olefins or for the copolymerization of such α-olefins.

In accordance with the process of the invention, the catalyst used has markedly high activity and the stereospecific property of the polymer product is very high. The apparent density of the polymer product is high, which is desirable from a standpoint of handling a slurry during the course of the production. Thus, the value of the polymer product is very high.

In the process of the invention, the step of removing the catalyst or the step of washing the polymer product can be simplified or omitted because the polymerization activity is very high. Accordingly, the polymerization can be carried out very efficiently.

The invention will be explained in greater detail with reference to the examples. In these examples, the reaction was performed in an argon atmosphere.

EXAMPLE 1

Preparation of Solid Catalyst Component

A mixture of 30 milliliters of dried n-heptane and 2.0 grams (18 millimoles) of magnesium diethoxide was placed in a 200 milliliters three-necked flask and stirred therein. Then, 0.6 gram (4.4 millimoles) of trichloro acetonitrile and 0.6 gram (1.8 millimoles) of tetra-n-butoxy titanium were added thereto at room temperature. The resulting mixture was then raised to 80° C., and the reaction was performed for 2 hours. The reaction product thus formed was washed twice with 100 milliliters of dried n-heptane at room temperature by a decantation method. Then, 30 millimoles of dried n-heptane and 0.5 gram (3.5 millimoles) of ethyl benzoate were added, and the reaction was performed at 98° C. for 1 hour. Thereafter, 34 grams (180 millimoles) of titanium tetrachloride was dropwise added thereto, and the reaction was carried out at 98° C. for 3 hours. After the reaction was completed, the product thus formed was repeatedly washed with n-heptane by a decantation method to provide a solid catalyst component. The supported titanium content of the solid catalyst component thus formed was measured by a colorimeter and was found to be 28 mg-Ti/g support.

Polymerization of Propylene

In a 1-liter autoclave were placed 400 milliliters of dried n-heptane, 2.0 millimoles of triethylaluminum, 0.02 milimole (as Ti) of the solid catalyst component as formed herein before, and 0.4 millimole of methyl p-toluylate as an electron donor compound, and the temperature of the resulting mixture was raised to 70° C. Then, 0.2 kg/cm² of hydrogen was introduced into the autoclave, and propylene was introduced so that the propylene partial pressure was 7.0 kg/cm² to start the polymerization. The pressure was adjusted by continuously feeding propylene so that the partial pressure was 7.0 kg/cm², and the polymerization was carried out at 70° C. for 2 hours. After the polymerization, the polymerization mixture was filtered at 70° C. to separate 84.0 grams of an insoluble polymer. Then, the filtrate was evaporated, and 2.0 grams of a soluble polymer was obtained. The insoluble polymer was extracted with boiling n-heptane in a Soxhlet extractor to provide an atactic polymer. The catalyst activity and the isotactic yield (I.Y.) were 90 kg/g-Ti-2 hrs. and 95%, respectively.

The catalyst activity and the isotactic yield are defined as follows:

Catalyst Activity

This is indicated by the total weight (kg) of all polymers formed per gram of a titanium atom for 2 hours; that is, polymers soluble in n-heptane at 70° C. and polymers insoluble in n-heptane at 70° C.

Isotactic Yield $$I.Y. = \frac{\text{Weight of Polymer insoluble in boiling n-heptane}}{\text{Weight of all Polymers formed}} \times 100(\%)$$

EXAMPLES 2 TO 9

In the same manner as in Example 1 except that 4.4 millimoles of a halogen-containing compound as shown in the Table below was used in place of the trichloro acetonitrile, a solid catalyst component was prepared and the polymerization of propylene was carried out. The results are shown in the following Table.

TABLE

| Example No. | Halogen-containing Compound | Catalyst Supported Titanium Content (mg-Ti/g-support) | Activity (kg/g-Ti 2 hours) | Polymer formed I.Y. (%) | Apparent Density* |
|---|---|---|---|---|---|
| 2 | n-butyl chloride | 25 | 131 | 90.3 | 0.35 |
| 3 | monochlorobenzene | 28 | 151 | 87.8 | 0.34 |
| 4 | allyl chloride | 22 | 74 | 96.3 | 0.37 |
| 5 | epichlorohydrin | 20 | 71 | 96.2 | 0.34 |
| 6 | carbon tetrachloride | 26 | 167 | 85.8 | 0.35 |
| 7 | methyl iodide | 24 | 190 | 89.6 | 0.38 |
| 8 | ethyl chloroformate | 11 | 115 | 86.7 | 0.36 |
| 9 | thionyl chloride | 28 | 151 | 92.6 | 0.38 |

*Apparent density of polymer insoluble in n-heptane at 70° C.

The $R^2$ and $R^3$ aryl groups are preferably phenyl and phenyl groups substituted with one or more hydrocarbon groups containing from 1 to 4 carbon atoms.

The halogen-containing compounds preferably contain from 1 to 10 carbon atoms and more preferably from 1 to 6 carbon atoms.

The aliphatic carboxylic acid esters preferably contain from 3 to 15 carbon atoms, and more preferably from 4 to 10 carbon atoms. The aromatic carboxylic acid esters are preferably those in which the aromatic group is a phenyl or substituted (preferably hydrocarbon substituted) phenyl group and the aromatic carboxylic acid ester preferably contains from 8 to 24 carbon atoms and more preferably from 8 to 18 carbon atoms.

The total amount of organic acid ester which is added, whether in the first or second step of the process or in both steps, is from 0.05 to 5 moles, preferably from 0.1 to 3 moles, per mole of magnesium compound.

What is claimed is:

1. A process for the stereospecific polymerization of propylene which comprises polymerizing propylene with a catalyst comprising (A) the reaction product of a magnesium compound and a titanium compound and (B) an organoaluminum compound, wherein Component (A) is prepared by the method consisting essentially of the following two steps:

(a) (i) a magnesium compound of the formula

wherein R$^1$ is an alkyl group having from 1 to 4 carbon atoms, (ii) at least one halogen-containing compound selected from the group consisting of trichloroacetonitrile, n-butyl chloride, monochlorobenzene, allyl chloride, epichlorohydrin, carbon tetrachloride, and methyl iodide, and (iii) an oxygen-containing titanium compound of the formula $$Ti(OR^2)_4$$

wherein R$^2$ is an alkyl group having from 1 to 6 carbon atoms, are reacted with each other at the same time in the presence or in the absence of an aromatic carboxylic acid ester to produce a solid reaction product; and (b) said solid reaction product formed in Step (a) is, as it is or after a pre-treatment with an aromatic carboxylic acid ester, reacted with at least one halogen-containing tetravaent titanium compound selected from TiCl$_4$, TiBr$_4$, CH$_3$OTiCl$_3$ and (C$_2$H$_5$O)$_2$TiCl$_2$ in the presence or in the absence of said aromatic carboxylic acid ester, and always in the presence of said aromatic carboxylic acid ester when said aromatic carboxylic acid ester was not used in at least one of the preceding steps.

2. The process of claim 1 wherein said halogen-containing compound is n-butyl chloride, allyl chloride, or methyl iodide.

3. The process of claim 1 wherein said halogen-containing compound is monochlorobenzene or epichlorohydrin.

4. The process of claim 1 wherein said halogen-containing compound is trichloroacetonitrile or carbon tetrachloride.

5. The process of claim 1 wherein said aromatic carboxylic acid ester is selected from methyl benzoate, ethyl benzoate, n-propyl benzoate, iso-propyl benzoate, n-butyl benzoate, iso-butyl benzoate, sec-butyl benzoate, tert-butyl benzoate, n-amyl benzoate, iso-amyl benzoate, methyl toluylate, ethyl toluylate, n-butyl toluylate, iso-butyl toluylate, sec-butyl toluylate and tert-butyl toluylate.

6. The process of claim 1 wherein said oxygen-containing titanium compound is selected from the group consisting of (CH$_3$O)$_4$Ti, (C$_2$H$_5$O)$_4$Ti, (nC$_3$H$_7$O)$_4$Ti, (n-C$_4$H$_9$O)$_4$Ti, and (C$_6$H$_{11}$O)$_4$Ti.

7. The process of claim 5 wherein said oxygen-containing titanium compound is selected from the group consisting of (CH$_3$O)$_4$Ti, (C$_2$H$_5$O)$_4$Ti, (nC$_3$H$_7$O)$_4$Ti, (n-C$_4$H$_9$O)$_4$Ti, and (C$_6$H$_{11}$O)$_4$Ti.

8. The process of claim 1 wherein said aromatic carboxylic acid ester is reacted in an amount of from 0.05 to 5 moles per mole of said magnesium compound.

9. The process of any one of claims 2, 3, 4, 5, 1, 6 or 7 wherein said aromatic carboxylic acid ester is reacted in an amount of from 0.1 to 3 moles per mole of said magnesium compound.

10. The process of claim 1 wherein the amount of said at least one halogen containing compound is 0.05–20 moles per mole of said magnesium compound.

11. The process of claim 1 wherein the amount of said oxygen-containing titanium compound is 0.02 to 5 moles per mole of said magnesium compound.

12. The process of claim 1 wherein component A is prepared at a temperature of from 0°–150° C.

13. A process for the stereospecific polymerization of propylene which comprises polymerizing propylene with a catalyst comprising (A) the reaction product of a magnesium compound and a titanium compound and (B) an organoaluminum compound, wherein Component (A) is prepared by the method consisting essentially of the following two steps at a temperature of from 0° to 150° C.:

(a) (i) a magnesium compound of the formula $$Mg(OR^1)_2$$

wherein R$^1$ is an alkyl group having from 1 to 4 carbon atoms, (ii) 0.05 to 20 moles per mole of said magnesium compound of at least one halogen-containing compound selected from the group consisting of trichloroacetonitrile, n-butyl chloride, monochlorobenzene, allyl chloride, epichlorohydrin, carbon tetrachloride, and methyl iodide, and (iii) 0.02 to 5 moles per mole of said magnesium compound of an oxygen-containing titanium compound of the formula $$Ti(OR^2)_4$$

wherein R$^2$ is an alkyl group having from 1 to 6 carbon atoms, are reacted with each other at the same time in the presence or in the absence of 0.05 to 5 moles per mole of said magnesium compound of an aromatic carboxylic acid ester to produce a solid reaction product; and (b) said solid reaction product formed in Step (a) is, as it is or after a pre-treatment with said aromatic carboxykic acid ester, reacted with at least one halogen-containing tetravaent titanium compound selected from TiCl$_4$, TiBr$_4$, CH$_3$OTiCl$_3$ and (C$_2$H$_5$O)$_2$TiCl$_2$ in the presence or in the absence of said aromatic carboxylic acid ester, and always in the presence of said aromatic carboxylic acid ester when said aromatic carboxylic acid ester was not used in at least one of the preceding steps.

14. The process of claim 13 wherein said oxygen-containing titanium compound is selected from the group consisting of (CH$_3$O)$_4$Ti, (C$_2$H$_5$O)$_4$Ti, (nC$_3$H$_7$O)$_4$Ti, (n-C$_4$H$_9$O)$_4$Ti, and (C$_6$H$_{11}$O)$_4$Ti.

15. The process of claim 13 wherein said aromatic carboxylic acid ester is reacted in an amount of from 0.1 to 3 moles per mole of said magnesium compound.

16. The process of claim 13 wherein said aromatic carboxylic acid ester is selected from methyl benzoate, ethyl benzoate, n-propyl benzoate, iso-propyl benzoate, n-butyl benzoate, iso-butyl benzoate, sec-butyl benzoate, tert-butyl benzoate, n-amyl benzoate, iso-amyl benzoate, methyl toluylate, ethyl toluylate, n-butyl toluylate, iso-butyl toluylate, sec-butyl toluylate and tert-butyl toluylate.

17. The process of claim 16 wherein said oxygen-containing titanium compound is selected from the group consisting of (CH$_3$O)$_4$Ti, (C$_2$H$_5$O)$_4$Ti, (nC$_3$H$_7$O)$_4$Ti, (n-C$_4$H$_9$O)$_4$Ti, and (C$_6$H$_{11}$O)$_4$Ti.

* * * * *